United States Patent [19]

Cartossi

[11] Patent Number: 4,782,993
[45] Date of Patent: Nov. 8, 1988

[54] PROCESS FOR MANUFACTURING TWIN LAYER BOTTOMS WITH FILLING OF THE HOLLOW SPACE

[75] Inventor: Ferdinando Cartossi, Stresa, Italy

[73] Assignee: AMC-International Alfa Metalcraft Corporation AG, Rotkreuz, Switzerland

[21] Appl. No.: 150,391

[22] Filed: Feb. 1, 1988

Related U.S. Application Data

[63] Continuation of Ser. No. 877,462, Jun. 23, 1986, abandoned.

[30] Foreign Application Priority Data

Jun. 26, 1985 [IT] Italy .............................. 21295 A/85

[51] Int. Cl.$^4$ .............................................. B23K 31/02
[52] U.S. Cl. ................................ 228/265; 29/445; 220/453; 228/184
[58] Field of Search ............... 29/460, 445; 228/155, 228/175, 193, 212, 243, 265, 184; 220/421, 453, 68

[56] References Cited

U.S. PATENT DOCUMENTS 3,173,302  3/1965  Farber .
4,029,253  6/1977  Cortossi ...................... 228/175 .
4,204,607  5/1980  Zani ................................. 220/68
4,552,284  11/1985  Rummelsburg ................ 220/453
4,596,236  6/1986  Eicle ........................... 220/68 X

FOREIGN PATENT DOCUMENTS 965732  2/1974  Italy .
340402  1/1931  United Kingdom .

Primary Examiner—Charlie T. Moon
Attorney, Agent, or Firm—Ladas & Parry

[57] ABSTRACT

A process for the application of twin layer bottoms on the pots, wherein the filling material of the hollow space is located on the bottom of the pot and kept at a certain distance from its profile, being a covering layer located above it, by operating them according to the Italian Pat. No. 965,732. The process is characterized in that the height of the filling material is at least 20% higher than the average thickness that the same material has at the end, and in that in the first phase of the deformation of this material a pressure is gradually applied from the center to the periphery, and in the second phase wherein the covering layer is kept in a mould and the filling material fills all the hollow space, said impact acts on said filling material in all the directions.

7 Claims, 3 Drawing Sheets

PROCESS FOR MANUFACTURING TWIN LAYER BOTTOMS WITH FILLING OF THE HOLLOW SPACE

This is a continuation of co-pending application Ser. No. 877,462 filed June 23, 1986, now abandoned.

DESCRIPTION

Processes are known for the safe coupling of two heterogeneous materials, such as, for instance, aluminium-stainless steel or copper-stainless.

Among these processes an expecially advantageous process is that disclosed by the Italian Pat. No. 965,732 described in its most pertinent portions herein.

Some difficulties are met when the above process is applied to the production of containers and, particularly, of pots having a twin layer bottom; that is pots having the bottom portion formed by a disk-shaped metal layer, more or less thin, made of good heat conducting materials such as aluminium or copper, this metal layer being further enclosed within a stainless steel covering.

The main drawbacks of the above mentioned process are gases forming on the surface and remaining enclosed within the two layers, which prevent the safe metal coupling.

Several methods were tried to eliminate these problems, but unsuccessfully; for instance either by making holes in the covering layer, which, however, are immediately closed as soon as the impact pressure is applied; or by working under vacuum, an operating condition extremely difficult to be carried out and maintained.

An object of the present invention is an improvement of the above process which overcomes the above-noted problems as well as others.

More particularly, an object of the invention is an improvement of the process for the application of twin layer bottom to pots, wherein the twin layers filling material is first located on the bottom of the pot and at a certain distance from the pot's edge and the outer layer is located over it; the operation is then carried out according to the Italian Pat. No. 965,732 as described below, characterized in that the height of the filling material is at least 20% higher than average thickness that the same material should have at the end of the operation and in that, in the first phase of deformation of the same material, the pressure is gradually applied from the center to the periphery.

To this purpose, the means for the application of the impact pressure are such that, either the outer layer or the bottom of the pot or both of them, show, after application of this pressure, a convexity directed towards the filling material, being the total camber of these convexities higher than 0.0025 of the average diameter pot bottom in its final form.

These means are made by a punch which enters the pot, a mould having the shape of the outer layer enclosing the filling material which, in its turn, is set to the bottom of the pot, being an impact pressure applied between the punch and the mould according to the Italian Pat. No. 965.732, wherein either the punch or the mould have a convexity directed towards the bottom of the pot, being the total camber of these convexities higher than 0.0025 of the average diameter of the pot bottom in its final form.

So, in the first phase which is mainly a deformation phase of the filling material, the same material is pressed at first in the center and then, as soon as the punch and the mould approach, towards the periphery: the material undergoes a centrifugal pressure removing stepwise the gases and filling the entire space between the cover layer and the pot bottom. Only at this point, that is with the mould in its final position, and with the covering layer well kept in the mould, the second phase starts: since the punch and the mould cannot approach closer, the remaining energy discharges as impact energy on the filling material which is compressed from all sides: particularly, at the peripheral band of said outer layer strongly adhering to the cover and the bottom of the pot.

A further advantageous characteristic consists in that a special shape is given to the filling material or to the convexities of the mould and of the punch, or to both of them so that the filling material during its movement from the center to the periphery reaches the upper part of the peripheral band of the covering layer contemporaneously on all said band.

The invention is following illustrated by a not limitative example, referring to a cylindrical pot as by the enclosed following figures.

Figure 1:
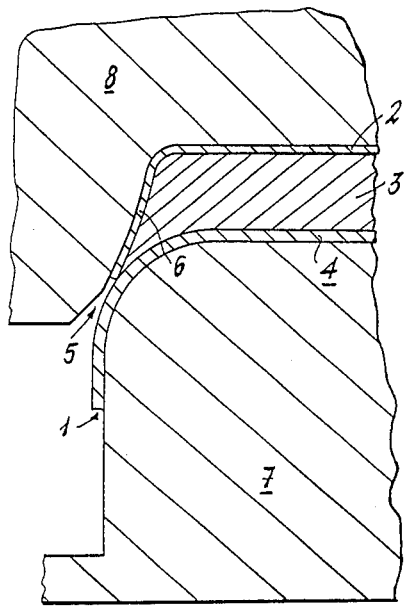
FIG. 1 shows a partial cross section of a pot having a twin bottom layer still located on the equipment used for its production.

Describing first Italian Pat. No. 965,732 to assist the reader, FIGS. 6 through 9 will be discussed. Italian Pat. No. 965,732 covers a process and respective tool to effect a firm and continuous bond between metallic thermo-conductive materials and support surfaces of stainless steel and similar metals.

For this purpose, for example to make containers of stainless steel with a thermo-conductive bottom—where the invention finds its particular though not exclusive application—it is necessary to effect a firm and continuous bond between the two materials which, as we know, present physical characteristics which make the bonding laborious and difficult, since the latter must satisfy not only the thermal requirements but also those of use requiring that the bond be continuous and undissolvable and remain such during use of the container and, in particular, during repeated abrupt temperature variations which often occur in practice.

The known processes apt to effect a bond between stainless steel and aluminum or copper are neither satisfactory nor practical, since they do not ensure the adhesion and continuity between the two metals and require long and complicated technical operations, some of which are a risk for the safety of the operator, since explosions and other accidents may occur. Besides, these known processes are expensive and therefore limited as to their practical application, especially when finished stainless steel products are required which must also be economical.

A typical use, though not an exclusive one, is the application to kitchenware which must have a thermo-conductive bottom and still be economically competitive.

Italian Pat. No. 965,732 offers a solution to this problem and others and allows one to effect a bonding of stainless steel surfaces of any kind with elements of well-defined geometrical shape so that the shape is maintained even after the bonding has taken place which ensures a continuous tight and undissolvable adhesion between the two metallic surfaces in question with simple and safe operations which are economically competitive. Besides, according to Italian Pat. No. 965,732, it is possible to apply sheets or plates of any thickness and shape of thermo-conductive material, such as aluminum and copper, to any stainless steel surface, thus facilitating heating by conduction of objects, particularly stainless steel containers, while said thermo-conductive sheets can be placed and arranged on the stainless steel support in any desired position, as required by the intended use.

The process according to the invention in which the bond between the stainless steel surfaces and the thermo-conductive material is effected by the concomitant action of heat and pressure, is characterized by fixing the thermo-conductive part or parts in the desired position on a surface of the stainless steel support, so that said bonded parts can freely expand; by subjecting the thus prepared elements to heat and bringing them to a high temperature close to the melting point of the thermo-conductive parts; by applying as soon as said heating temperature has been attained at least one impact pressure to the element in question, while the edges of said thermo-conductive parts are treated during application of the impact pressure so that the latter is exerted and transmitted over the entire surface of the thermo-conductive parts held in a state of coaction and made to adhere to the support surface of stainless steel, thus to effect a stable and undissolvable bond between the parts in question.

The above concept is susceptible to a great many forms of embodiments. Thus, for example, in order to attain the free and uniform expansion of the steel support and thermo-conductive parts, the connection between said parts is made advantageously by electric welding, preferably resistance or stitch welding to ensure the mechanical connection between said parts which, on the other hand, can freely expand during preheating.

The location of the welded joint between the two metallic parts can be provided in the most convenient position in respect to the geometrical shape of the one or more conductive metallic parts in question. For example, in the case of a regular geometrical figure (polygon or circle), the joints are made in the central area or in a peripheral zone of said central area.

The tool to carry out the above-described process is distinguished by a fixed and a mobile part, one of which presents at least one indentation reproducing in the negative the shape and form of the thermo-conductive part, and the rim of said indentation is provided with a surface which tightly engages the face of the stainless steel support to hold the material of said thermo-conductive part when impact pressure is applied to it.

Italian Pat. No. 965,732 will now be explained with reference to the embodiment of the process and the enclosed drawings which illustrate, as an example only, one preferred form of making a mold to effect the bonding between a stainless steel container and a metallic thermo-conductive part. In said drawing, FIGS. 6 through 9 show schematically in section some characteristic stages of the process according to said invention.

With reference to the figures of the drawing which illustrate a container A made of stainless steel, to its bottom A1 is applied by means to be explained hereafter a second bottom B of thermo-conductive metal, such as, for instance, aluminum. In the case in question, it is assumed that bottom A1 of container A is circular and therefore double bottom B is also circular with an essentially equal diameter as the surface of bottom A1 to which said second bottom is to be applied.

The thickness of second bottom B may vary in compliance with requirements from time to time indicated; for example, said thickness may vary from ½ to 1/20 of the thickness of the wall of stainless steel support A1.

We must point out that, according to this invention, there is practically no limitation as to the kind of stainless steel that can form the support surface A1, i.e., any kind if stainless steel now on the market may be used for said support without said surface requiring special treatments, it may be glossy or flat. In practice, however, it is advantageous and convenient to have the support surface A1 of stainless steel non-glossy or sanded.

The aluminum double bottom B is first applied to the bottom of container A, so that the shape of said double bottom is arranged in the exact desired position. In the case illustrated, the edge of the double bottom is uniformly spaced from the peripheral wall A2 of container A.

The double bottom B is fixed to support A1 by any convenient method. Preferably this is done by means of weld seam K in the central area of support A1 so as to effect the mechanical bond in a central area where the connection between the surface of support A1 and that of the double bottom B is complete in all respects.

Said mechanical bond between the steel support A1 and the double bottom B of thermo-conductive material is made in a duly central area so that the two parts in question may freely expand and also deform during the heating operation hereafter described.

The welded seam K, as already stated, may be of any known kind; preferably, the connection between the two surfaces is made by electrical resistance welding. Obviously, instead of applying the seam K in the central area, two or more welding stitches could be applied and arranged so as to attain the purpose mentioned and, in particular, to control the expansion of the materials making up the support A1 and the double bottom B.

The thus-prepared element A-B consisting of the container A and the double bottom B (see FIG. 7) is then introduced into a pre-heating oven of any suitable kind which brings said element to a predetermined temperature, generally close to the melting point of the material making up the thermo-conductive part B. If the double bottom B is of aluminum, the pre-heating temperature of the element A-B ranges from 500 to 650 degrees C.; if said double bottom B is of copper, said temperature is increased to between 900 and 1000 degrees C. The pre-heating operation is carried out so that the maximum temperature mentioned is attained in the entire structure of support A1 and double bottom B. Subsequently the element A-B is removed from the oven and immediately set onto the stationary part D of the tool which is duly fixed to the stationary table of a press with suitable characteristics. The fixed part D1 is a semi-mould of a shape corresponding to the inside of container A and, in particular, to the section presented by the support wall A1, so that the inner face of the latter adheres continuously to the surface of said semi-mould D1. The semi-mould D1 is combined with a countermould D2 made up of the mobile part of the tool and is conveniently fixed to the mobile table of the press under consideration.

It must be pointed out that for the purpose of carrying out the present invention, the countermould D2 must be made pursuant to special criteria intended to ensure the desired bond between the support wall A1 and the double bottom B. Actually, the countermould D2 has a cavity 10, shaped so as to reproduce the shape of the double bottom B and of sufficient depth to receive said bottom B completely and under pressure. Besides, the countermould D2 has a peripheral wall 12 (see FIGS. 8 and 9) which delimits contours essentially corresponding to contours B2 of the double bottom B. Besides, said peripheral wall 12 has an annular section 14 equipped with a tapered or duly shaped surface so as to adhere to the external surface of the connection A4 between the support surface A1 and the peripheral wall A2 of the containers A, i.e., a seal must be affixed between the annular surface 14 and that of connection A4, which, as shall later be explained, prevents the metal of the double bottom B from sliding from cavity 10 of the countermould D2.

In order to ensure a tight connection between the shaped edge 14 and the connecting surface A4, the peripheral wall 12 may be equipped with tapers 16 duly designed to provide a certain elasticity during the pressing operation. Besides, and in relation to the characteristics of the embodiment of the process, the peripheral wall 12 may be equipped with reinforcement rings.

As already stated, the element A-B is extracted from the oven and immediately put onto the fixed stamp D1. This operation must be done within a very short time in order to prevent cooling of said element. According to this invention, this requirement may be met with a certain facility because of the monoelasticity of element A-B.

After placing element A-B on the mould D1, the press is activated to lower the countermould D2 rapidly, almost instantly—i.e., within the shortest possible time—so that the cavity 10 of said countermould receives the double bottom B and exerts on the latter a very high impact pressure in the order of 2000-3500 kg/cm$^2$ which spreads instantly to all sections of the two surfaces of elements A1-B.

It must be pointed out that during the descent of the mobile part D2 of the mould, the cavity 10 first grips the double bottom B and successively starts the contact between the wall of bottom 10 of the countermould D2 and the upper face of said double bottom. An impact pressure is applied to the material of the double bottom B which increases in just a few seconds and very rapidly for the above-indicated reasons. At the same time, the bonding between the shaped rim 14 and the peripheral area A4 of the containers A is attained, so that the further pressure exerted on bottom B is directly transmitted against the support wall A1 of the container. In view of the high pressure applied to bottom B and the rapidity with which said pressure is exerted and also in consideration of the fact that the bottom B is connected by the central welding K to the support wall A2, the adhesion and bond between the two surfaces is perfectly and satisfactorily stabilized, so that the resulting bond extends continuously over the entire surface. The connection between the surfaces in question is made partly also by fusion, since the double bottom B as well as container A are at very high temperatures.

Eventually and particularly in order to stabilize the bond thus obtained, a second or third impact pressure of due value are exerted on the bonded area so as to ensure an even bond.

Successively, the object A-B is removed and practically needs no further finishing, also because the joints between the steel support A1 and the double bottom B present no areas of discontinuity and are smooth and adherent to the wall A2 of container A.

The object obtained then undergoes a polishing and shining operation required by the intended use.

With reference to these figures, a finished pot includes a main part 1, a covering layer 2 and filling material 3.

According to the process of the present invention, the main part 1, is usually made of stainless steel, first undergoes the usual preliminary cleaning and degreasing operations; the same for the covering layer 2.

Figure 2:
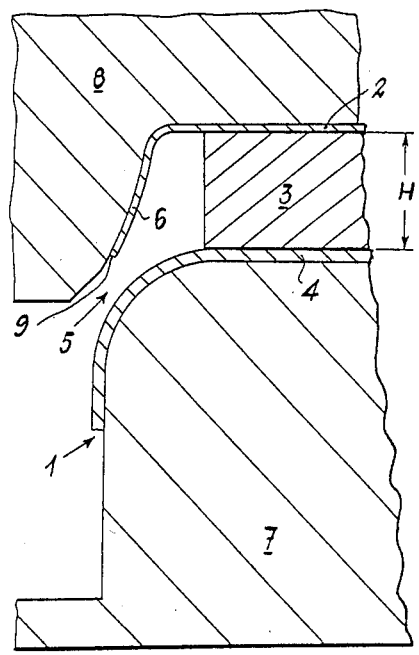
FIG. 2 shows a partial cross section of the pot at the beginning of the phase of application of the covering layer.
Figure 4:
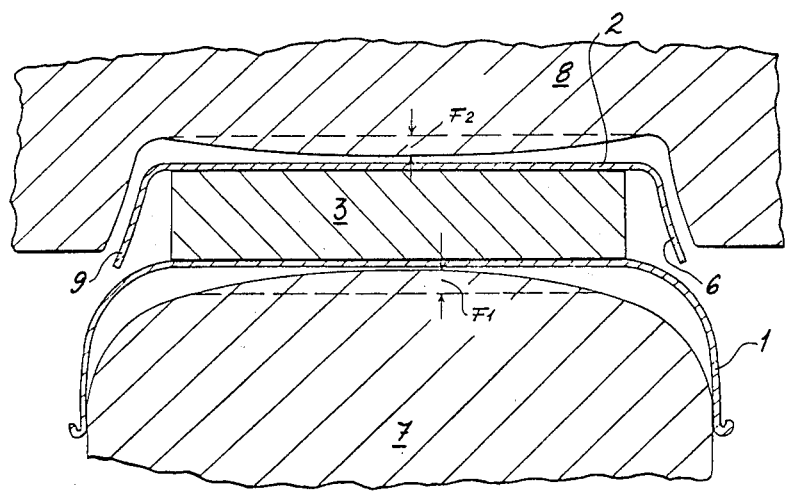
FIG. 4 is a cross section having a convexity exaggerated for sake of clarity, in a starting phase according to the present invention.

The filling material is prepared in the form of one or more discs that will constitute the thermoconductor layer of the bottom of the stainless steel pot 4. The size and, particularly, the height H of these discs (3 in FIGS. 2 and 4) are calculated according to the final result to be obtained, increasing the height at least 20% in respect of the height which this or these discs must have at the end and decreasing their diameter proportionally; by so operating, it is possible to obtain a space or a slit 5 (FIG. 2) between the bent part 6 of the covering layer 2 and the external surface of the main part 1 of the pot.

In order to obtain an easily handling device, the process is advantageously carried out according to the Italian Pat. No. 965,732, by connecting together by welding the disc 3, the bottom 4 of the pot 1 and the covering layer 2 preferably with a welding point in their central part, preferably by a resistance welding.

The so obtained device is then heated in an oven, at the temperature near but lower than the melting point of the metal which forms layer 2 as discussed in the aforementioned Italian Patent. In case of aluminium or its alloys, this temperature is maintained from 400° to 650° C.

Figure 5:
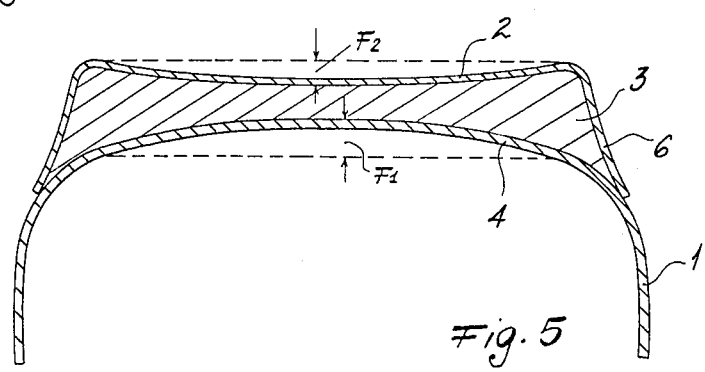
FIG. 5 is a cross section, similar to FIG. 4, of a finished pot.
Figure 6:
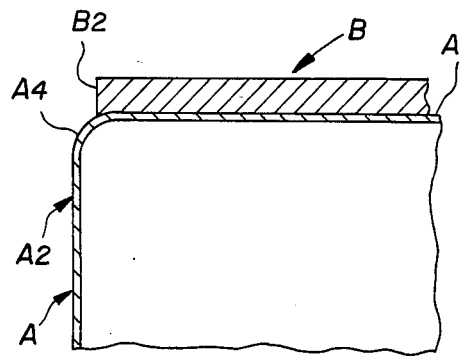
FIG. 6 is an illustration in section of the pot bottom of Italian Pat. No. 965,732.
Figure 7:
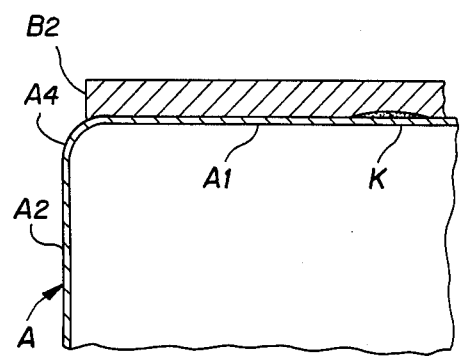
FIG. 7 is a further illustration in section of the pot bottom of Italian Pat. No. 965,732.
Figure 8:
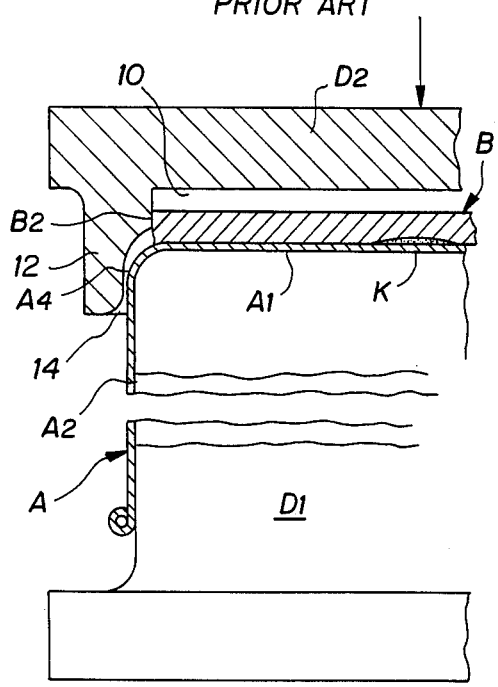
FIG. 8 is a further illustration in section of the pot bottom of Italian Pat. No. 965,732 including a portion of the mould.
Figure 9:
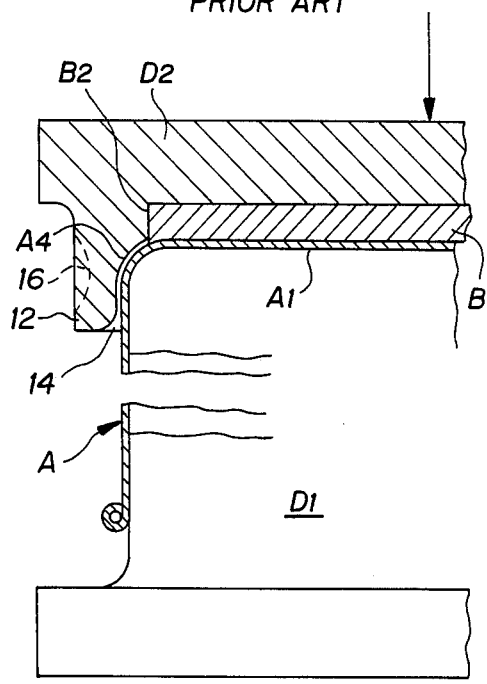
FIG. 9 is a further illustration in section of the pot bottom of Italian Pat. No. 965,732 with the mould placed against the pot bottom.

When the prefixed temperature is reached, the so prepared pot is located on the fixed punch 7 of the mold whose the upper part has a suitable convexity and is fixed on the plane of a press (not shown). The mobile portion 8 of the mould has too a certain convexity and this part is fixed to the stroking mass of this press. Each convexity has a camber $F_1$ and $F_2$ respectively (FIG. 5) and their sum $F=F_1+F_2$ depends on the diameter of the bottom 4 of the pot 1 and, practically, its size is at least 0.0025 of said diameter. In practice, for a diameter of 200 mm, this convexity is 0.5 mm. This value can be divided between the two parts $F_1$ and $F_2$ or given only to one of them and this according to the results to be obtained.

An impact pressure produced by a walking beam wherein the stroking mass is provided with an acceleration, is applied to the moving part 8 of the mould.

At the beginning (FIG. 2) of the deformation phase of the material 3, under the impact effect, the pressure works only on the central part thereof and due to the mentioned convexity spreads out gradually toward the periphery. In such a way, the material 3 comes into contact gradually with the parts 2 and 4 and the existing gas can flow outside through the slit 5.

It is important to notice, in fact, that the above mentioned convexity during the application of the impact pressure, causes a centrifugal effect on the gases or other materials which are occluded between the metallic surfaces to be joined; furthermore, this convexity exerts on the filling material an effect of centrifugal expansion facilitating the expulsion of gases.

Figure 3:
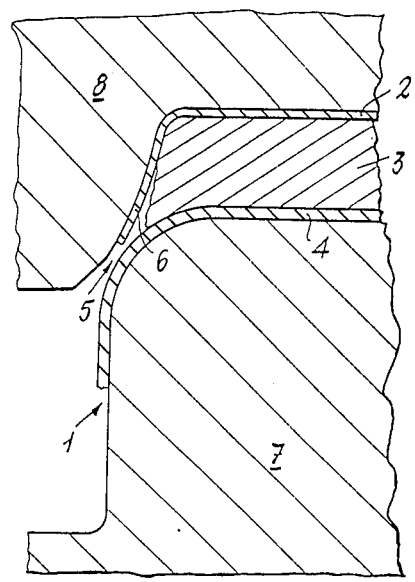
FIG. 3 is a cross section similar to that of FIG. 2 in a more advanced phase.

The process proceeds by a gradual expulsion of the gases (FIG. 3), until the material (its volume has been suitably calculated) fills the whole cavity and the peripheral band 6 of the covering layer comes into contact (or almost) with the pot reaching in this way the form of FIG. 1.

Clearly according to the correct application of the process, the edge of the covering layer 2 comes into contact with the surface of the pot 1 just contemporaneously or after the filling material 3 has completely filled all the available space.

At this moment, the deformation phase is over and the residual energy (which is the main part of the initial energy) of the stroking mass discharges with impact on the device resulting in a close coupling and a molecular compenetration, of the three layers 2, 3, and 4 as by the above mentioned Italian Pat. No. 965.732.

It is to be noted that, due to the above mentioned convexity, the filling metal layers, besides being compressed and connected through metal with the external layers 2 and 4, undergo a centrifugal pulsion compressing and pushing them violently against the peripheral portion 6 of the covering layer, which is kept by the mould in its final position; therefore a close coupling and a molecular compenetration are assured also between the peripheral part 6 of the covering layer and the periphery of the inner layers.

This process represents a remarkable improvement with respect to the results achievable with other processes for the application of twin layer bottoms, for instance with the usual brazing process.

The close coupling between the filling material and the twin layers 2, 4 in their total contact surfaces, including the peripheral ones, is peculiarly suitable in the production of kitchen pots, where the main efforts are devoted to obtaining the monolicity of the objects for heating transmission and hygienic reasons.

A further advantage in comparison with other processes for application of twin layer bottoms, is the possibility to give the desired shape to the covering layer by the mould containing it during the application of the impact pressure.

A further advantage consists in that the thermoradiating bottom, as the above described application operation is over, shows a cavity able to compensate the dilation caused by the future contact with heating sources: the size of this cavity can be suitably calculated, according to the limits of the process, so that perfect planarity of the bottom, once heated, is assured.

The above process has been described with reference to a pot having a circular cross section wherein the discs 3 are normally circular its periphery following the profile of the pot and obviously have a diameter smaller than that of the pot. Also the mould 8 and punch 7 have generally a spherical cap shape.

In case of pots having a non circular cross section, it is advisable to operate so that the filling material reaches during its centrifugal pulsion, the surface connecting the bottom 2 and the side band 6 at the same time over the whole perimeter.

To this purpose, it is possible to operate either maintaining the punch 7 and/or the mould 8 in the shape of a portion of a spherical cap and shaping suitably the filling material and arranging it with different sizes on the different axes with respect to the pot profile (therefore its edge does no more than follow the periphery of the pot bottom) or acting on the curvature of the mould and maintaining the edge of filling material so as to follow the periphery of the pot bottom, or obviously a combination of both.

The above example illustrates a particular shape of a twin layer bottom, but the invention is achievable to all the possible different forms both of the twin layer bottom and of the container, being all of them object of the invention.

I claim:

1. A process for manufacturing a layered bottom of a metal pot wherein said bottom is comprised of the pot bottom, said pot bottom having a first perimeter; an intermediate metal filling layer of heat conductive material, said intermediate filling layer having a perimeter that is smaller than that of said pot bottom and a melting temperature lower than that of said pot bottom; and an outer metal layer being somewhat cake-pan like in shape with sides and a base such that it may receive said intermediate fillng layer, said outer layer having an inside perimeter greater than said perimeter of said intermediate filling layer, and having a melting point greater than that of said intermediate filling layer, said process being comprised of the following steps:

performing cleaning and degreasing operations on the necessary intermediate and outer layers and said pot bottom;

placing said intermediate filling layer of a given thickness and diameter generally centrally of said pot bottom, said intermediate filling layer having an initial thickness that is at least 20% greater than the thickness of the intermediate filling layer when said process is completed, said diameter being decreased proportionately when calculating said initial thickness;

locating said outer layer over said intermediate filling layer such that said intermediate filling layer is generally housed within said outer layer sides and base;

heating said intermediate and outer layers and said pot bottom to a temperature nearing that of said melting point of said intermediate filling layer;

applying an impact pressure to said intermediate and outer layers and said pot bottom, said impact pressure being first applied generally centrally of said layers and then moved outwardly therefrom such that said outer layer sides are brought into peripheral contact with said pot bottom and said intermediate filling layer is flattened to completely fill the space between said pot bottom and said outer layer and metallurgically bonded thereto.

2. The process of claim 1 further comprising a manufacturing step prior to said degreasing step which step is the manufacturing of said intermediate filling layer of metal and said outer layer and at least said pot bottom of stainless steel.

3. The process according to claim 1 further comprising the step of shaping said outer layer and said pot bottom such that at least one of said outer layer and said pot bottom has a generally central convexity directed toward said intermediate layer.

4. The process according to claim 3 further comprising the step of placing said bottom of said pot on a fixed punch shaped generally to correspond to that of said pot bottom and placing said external layer within a mould shaped generally to correspond to that of said outer layer, said placing step facilitating said step of applying said impact pressure wherein pressure is first applied generally centrally of said layers and then moved outwardly therefrom, said outer layer being constrained from expansion by said mould.

5. The process of claim 3 wherein during said step of shaping said outer layer and said pot bottom, the combined camber of said at least one central convexity is at least 0.0025 of the width of said outer layer of said pot after said impact pressure.

6. The process of claim 1 wherein during said step of applying said impact pressure said intermediate filling layer is caused to abut generally simultaneously said sides of said outer layer.

7. The process of claim 1 further comprising the step of producing a disk-like intermediate layer.

* * * * *